US008579501B2

(12) United States Patent
Marechal et al.

(10) Patent No.: US 8,579,501 B2
(45) Date of Patent: Nov. 12, 2013

(54) MAGNETIC AND/OR ELECTROSTATIC ANTI-SHOCK DEVICE

(75) Inventors: Sylvain Marechal, Bois-d'Amont (FR); Davide Sarchi, Renens (CH)

(73) Assignee: Montres Breguet S.A., L'Abbaye (CH)

( * ) Notice: Subject to any disclaimer, the term of this patent is extended or adjusted under 35 U.S.C. 154(b) by 151 days.

(21) Appl. No.: 13/290,606

(22) Filed: Nov. 7, 2011

(65) Prior Publication Data

US 2012/0113767 A1 May 10, 2012

(30) Foreign Application Priority Data

Sep. 11, 2010 (EP) .................................... 10190511

(51) Int. Cl.
*G04B 31/02* (2006.01)
*H02K 7/09* (2006.01)

(52) U.S. Cl.
CPC ...................................... *G04B 31/02* (2013.01)
USPC ........................... 368/324; 368/326; 310/90.5

(58) Field of Classification Search
USPC ........... 368/287, 322–326; 310/90.5; 384/446
See application file for complete search history.

(56) References Cited

U.S. PATENT DOCUMENTS

| | | | | |
|---|---|---|---|---|
| 3,635,013 A * | 1/1972 | Bertsch et al. | ................ | 368/169 |
| 3,954,310 A * | 5/1976 | Rava | ............................ | 310/90.5 |
| 4,308,605 A * | 12/1981 | Ayer | ............................ | 368/127 |
| 6,218,751 B1 * | 4/2001 | Bohlin | ......................... | 310/90.5 |

FOREIGN PATENT DOCUMENTS

| | | |
|---|---|---|
| CH | 351472 | 1/1961 |
| DE | 1 211 460 | 2/1966 |
| DE | 198 54 063 A1 | 10/2000 |
| FR | 1 314 364 | 1/1963 |
| FR | 1 339 728 | 10/1963 |

OTHER PUBLICATIONS

European Search Report issued May 16, 2011, in European Patent Application No. 10190511.5, filed Nov. 9, 2010.

* cited by examiner

*Primary Examiner* — Vit W Miska
(74) *Attorney, Agent, or Firm* — Oblon, Spivak, McClelland, Maier & Neustadt, L.L.P.

(57) ABSTRACT

Anti-shock device for the protection of a timepiece component pivotally mounted between a first and a second end in a chamber. The component is freely mounted in the chamber between pole pieces, which are distinct from the component and located in proximity to the chamber and the device includes a device for attracting the first end held in abutment on only the first pole piece, and a device for attracting the second end towards a second pole piece, the devices for attracting the first end and the second end, which are of magnetic and/or electrostatic nature, can move along an axial direction between stop members.

21 Claims, 3 Drawing Sheets

MAGNETIC AND/OR ELECTROSTATIC ANTI-SHOCK DEVICE

This application claims priority from European Patent Application No. 10190511.1 filed Nov. 9, 2010, the entire disclosure of which is incorporated herein by reference.

FIELD OF THE INVENTION

The invention concerns an anti-shock device for the protection of a timepiece component, made of material that is at least partially magnetically permeable or respectively at least partially magnetic, and/or of material that is at least partially conductive or respectively at least partially electrized, wherein said component is pivotally mounted in a chamber between a first end and a second end of said component.

The invention also concerns an anti-shock device of this type for the protection of a timepiece component, made of material that is at least partially magnetically permeable, or at least partially magnetic at a first end and at a second end.

The invention further concerns an anti-shock device of this type for the protection of a timepiece component, made of material that is at least partially conductive, or at least partially electrized at a first end and at a second end.

The invention also concerns a magnetic and/or electrostatic pivot, including a timepiece component, made of a material that is at least partially magnetically permeable or at least partially magnetic at a first end and at a second end, or respectively at least partially conductive or at least partially electrized at a first end and at a second end.

The invention also concerns a timepiece including at least one anti-shock device of this type, and/or at least one magnetic and/or electrostatic pivot of this type.

The invention further concerns a timepiece including at least one timepiece movement of this type, and/or at least one anti-shock device of this type, and/or at least one magnetic and/or electrostatic pivot of this type.

The invention concerns the field of micro-mechanics and in particular horology, to which it is particularly well suited.

BACKGROUND OF THE INVENTION

Horological technique employs conventional solutions to ensure the anti-shock functions of timepiece components, such as a balance. These solutions are based on the elastic and viscoelastic response of parts having an anti-shock function and on the mechanical friction between the anti-shock devices and the component to be protected. Conventional anti-shock devices are characterized, in particular, by an acceleration threshold below which the anti-shock device is not deformed and by a function of radially re-centering the component after the shock, which is relatively inaccurate.

The problems to be solved are thus as follows:

Ensuring precise radial re-centering after the shock.

Achieving an anti-shock solution which, is independent of mechanical friction, which has the drawback of reducing the efficiency/quality factor of the components during normal operation, i.e. in the absence of any shocks.

DE Patent 12 11 460 in the name of SIEMENS AG is known, which discloses a component, formed by a pin integral with an internal tubular magnet, inserted into an external tubular magnet. The external tubular magnet can move inside a cartouche, coaxial to the two magnets, against a support surface in abutment at one end, and against a spring held by a bush at the other end. This component is also axially guided on a spindle integral with the bush. At each axial end, the component includes a protective sleeve for the fragile ceramic core formed by the internal magnet. The means for guiding pivoting is formed by the cooperation between the two internal and external tubular magnets. However, the holding of the component on the first pole piece is not equivalent to a support since there is a connection between this component and the internal tubular magnet, via a flange and one of the two sleeves. Consequently, the component of this patent is not free relative to the first pole piece formed by the internal magnet, but only relative to the second pole piece, formed by the external magnet.

Another Patent, DE 19854063A1, in the name of VLADIMIR JAGMANN is known, which discloses a component made of magnetizable material levitated between two pole pieces, which generate a magnetic field which is always in a perpendicular direction to the pull of gravity, the orientation by working is always the same.

SUMMARY OF THE INVENTION

To overcome the limits of the prior art, the invention proposes a configuration for protecting a component, and particularly a timepiece component, pivotally mounted between holding means either with or without contact.

The essential feature is the mobility of this holding means, whose normal operating position is a position of stable equilibrium, this holding means can move, relative to a structure, under the effect of a strong acceleration created by a shock, so as to preserve the integrity of the component and its environment.

The invention therefore concerns an anti-shock device for the protection of a timepiece component, made of material that is at least partially magnetically permeable, or respectively at least partially magnetic, and/or of material that is at least partially conductive, or respectively at least partially electrized, wherein said component is pivotally mounted in a chamber between a first end and a second end of said component, characterized in that said anti-shock device includes, on both sides of said first and second ends, on the one hand means for attracting said first end to keep said first end abutting on a first pole piece, and on the other hand, in proximity to a second pole piece, means for attracting said second end towards said second pole piece, and in that said means for attracting said first end on the one hand and said means for attracting said second end, on the other hand, can move along an axial direction between stop members, and further characterized in that said first pole piece and said second pole piece are distinct from said component, and are each located on the periphery of or in proximity to said chamber, and are each made of material that is at least partially magnetic, or respectively at least partially magnetically permeable, and/or of material that is at least partially electrized or respectively at least partially conductive, and further characterized in that said component is freely mounted inside said chamber between said pole pieces, so as to rest on a support surface in proximity to only one of said pole pieces.

According to a feature of the invention, this anti-shock device includes means for damping the movement of at least one or each of said pole pieces, and/or means for elastically returning at least one or each of said pole pieces, said damping means and/or said elastic return means being arranged to absorb the energy transmitted to said pole pieces in the event of a shock, and, after said shock, to return at least one or each of said pole pieces to the position of stable equilibrium occupied thereby prior to said shock. The good positioning and centering are established by magnetic or electrostatic forces and not by the elastic return forces.

In a particular embodiment, it is proposed to make an anti-shock system for a timepiece component, for example a balance staff, based on magnetic interaction. For typical timepiece dimensions and using commercially available micro-magnets, it is possible to generate magnetic forces greater than the force of gravity and the torque acting on the component during operation. A system governed by magnetic forces is supposed to be capable of returning exactly to its position of magnetic equilibrium after a shock.

The invention therefore also concerns an anti-shock device of this type for the protection of a timepiece component, made of material that is at least partially magnetically permeable, or at least partially magnetic at a first end and at a second end, characterized in that it includes, on both sides of said first and second ends, at a greater air-gap distance, by the value of a determined operational play, than the distance of centers between said first end and said second end, a first surface of a first pole piece and a second surface of a second pole piece, wherein said magnetic poles pieces are arranged either each to be attracted by a magnetic field transmitted by one of said first or second ends of said component, or each to generate a magnetic field attracting one of said first or second ends of said component, and wherein said magnetic fields have a different intensity at said first end and said second end, such that the magnetic attraction forces being exerted on said component at the two ends thereof are of different intensity, so as to attract said component via one of the said two ends thereof, in direct or indirect contact onto only one of said surfaces of said pole pieces, and in that said first pole piece and said second pole piece can each move inside a chamber between two stop members.

The invention also concerns an anti-shock device of this type for the protection of a timepiece component, made of material that is at least partially conductive or at least partially electrized at a first end and at a second end, characterized in that it includes, on both sides of said first and second ends, at a greater air-gap distance, by the value of a determined operational play, than the distance of centers between said first end and said second end, a first surface of a first pole piece and a second surface of a second pole piece, wherein said magnetic poles pieces are arranged either each to be attracted by an electrostatic field transmitted by one of said first or second ends of said component, or each to generate an electrostatic field attracting one of said first or second ends of said component, and wherein said electrostatic fields have a different intensity at said first end and said second end, such that the electrostatic attraction forces being exerted on said component at the two ends thereof are of different intensity, so as to attract said component via one of the said two ends thereof, in direct or indirect contact onto only one of said surfaces of said pole pieces, and in that said first pole piece and said second pole piece can each move inside a chamber between two stop members. The invention also concerns a magnetic and/or electrostatic pivot including a timepiece component, made of a material that is at least partially magnetically permeable or at least partially magnetic at a first end and at a second end, or respectively at least partially conductive or at least partially electrized at a first end and at a second end, including an anti-shock device of this type.

The invention also concerns a timepiece including at least one anti-shock device of this type, and/or at least one magnetic and/or electrostatic pivot of this type.

The invention further concerns a timepiece including at least one timepiece movement of this type and/or at least one anti-shock device of this type, and/or at least one magnetic and/or electrostatic pivot of this type.

BRIEF DESCRIPTION OF THE DRAWINGS

Other features and advantages of the invention will appear upon reading the following description, with reference to the annexed drawings, in which.

DETAILED DESCRIPTION OF PREFERRED EMBODIMENTS

Figure 1:
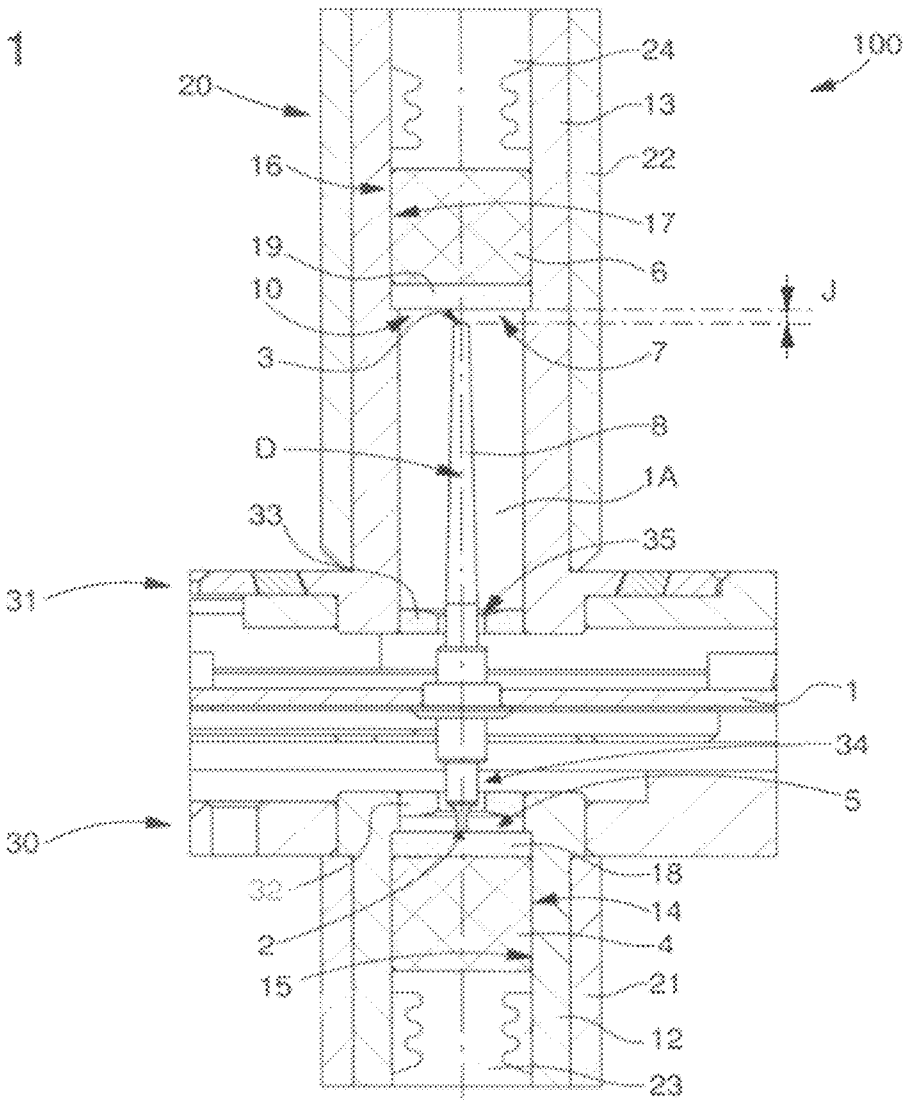
FIG. 1 shows a schematic longitudinal cross-section along a pivot axis of a first embodiment of a device according to the invention, applied to the protection of a timepiece component.
Figure 2:
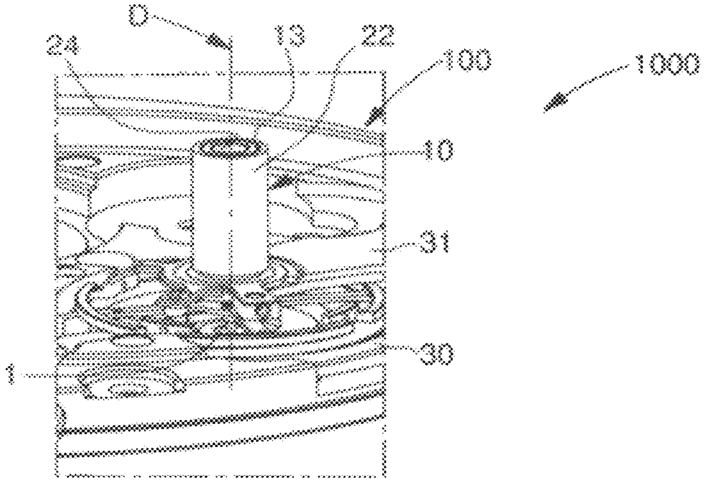
FIG. 2 shows a schematic, perspective view of a timepiece including a movement incorporating a device according to the invention.

Thus, the invention concerns an anti-shock device 10 for the protection of a timepiece component 1 pivotally mounted between a first end 2 and a second end 3.

This anti-shock device 10 includes, on both sides of said first end 2 and second end 3, on the one hand, means for guiding the pivoting of or means for attracting first end 2, held abutting on a first pole piece 4, distinct from component 1 and, on the other hand, in proximity to a second pole piece 6, distinct from component 1, means for guiding the pivoting of the second end 3 or means for attracting said second end 3 to the second pole piece 6.

Component 1 is, at least in proximity to the first end 2 and the second end 3 thereof, preferably made of a magnetically permeable and/or conductive material. In a particular embodiment of the invention, this material is also magnetized and/or electrized.

Figure 4:
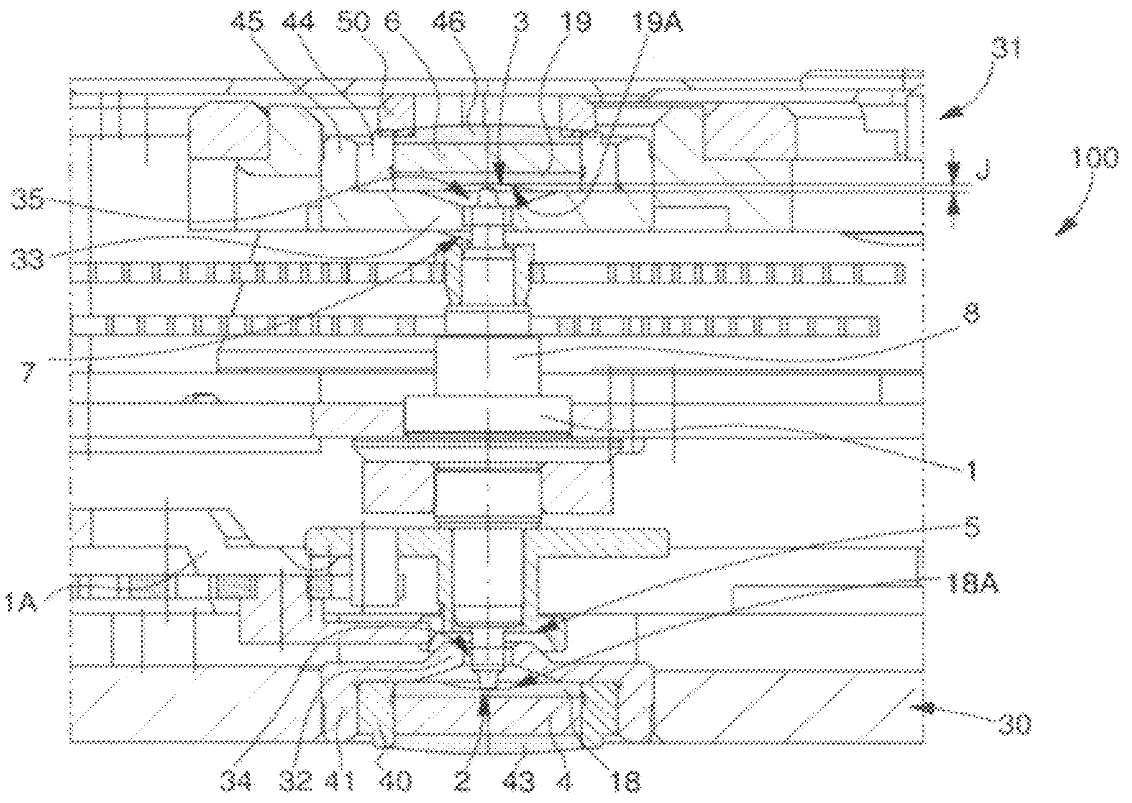
FIG. 4 shows a schematic, longitudinal cross-section along a pivot axis of a variant of the first embodiment of a device according to the invention, provided with a damping device.

Component 1 can move in a chamber 1A. A "pole piece" means a mass, which, at least in proximity to chamber 1A, is made of a magnetically permeable and/or conductive material, or, in a particular, preferred embodiment of the invention, in a magnetized and or electrized material. The pole piece 4 or 6 does not form part of component 1, and is thus located at the periphery of or in proximity to chamber 1A:

In a first embodiment, for example as seen in FIGS. 1 and 4, the pole piece is separated from chamber 1A by a strut, which includes a support or stop surface for component 1. In FIG. 1, a first pole piece 4 is thus separated from component 1 by a strut 18, which includes a first support surface 5 of this type, and a second pole piece 6 is separated from component 1 by a strut 19, which includes a second stop surface 7 of this type. In this variant, although they have no direct contact with component 1, the pole pieces interact therewith, depending upon the particular case, via magnetic and/or electrostatic attraction or repulsion: either one axial end of component 1 in axial direction D is magnetized or electrized, and cooperates with the closest pole piece, which is magnetically permeable or conductive under the action of a magnetic or electrostatic force, or conversely, one axial end of component 1 in axial direction D is magnetically permeable or conductive, and cooperates with the closest pole piece, which is magnetized or electrized.

Figure 3:
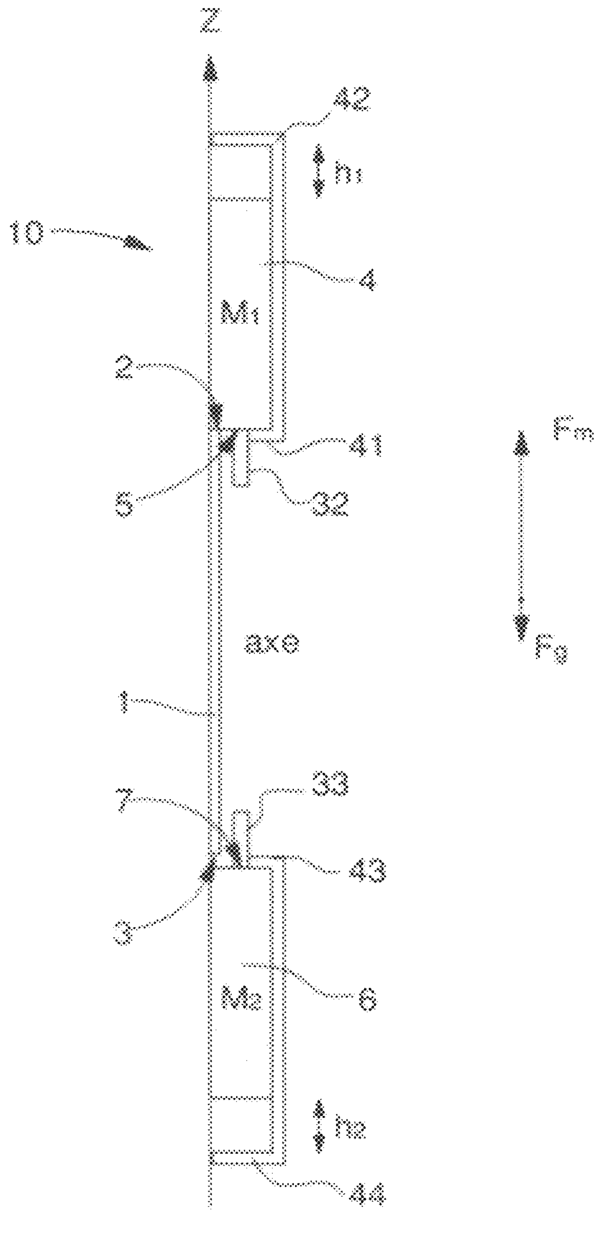
FIG. 3 shows a schematic, plan view of the operating principle of the device according to another embodiment of the invention.

In another embodiment, as seen in FIG. 3, this pole piece may include a surface forming one of the lateral surfaces of chamber 1A, which the first end 2 or second end 3 of component 1 is capable of coming in proximity to or in contact with. Preferably, when component 1 is a component pivoting about a pivot axis D, this surface of the pole piece is located in the continuation of said axis D. The magnetic and/or electrostatic interaction occurs as in the preceding case, but without the struts: component 1 is then in direct contact with one of the pole pieces.

Other embodiments concern different variants at each end of component 1: direct contact on one side, indirection repulsion or attraction force on the other.

The first pole piece 4 and the second pole piece 6 are distinct from component 1 and are each located at the periphery of or in proximity to chamber 1A and are each made of at least partially magnetic, or respectively at least partially magnetically permeable material, and/or at least partially electrized, or respectively at least partially conductive material. Component 1 is freely mounted in chamber 1A between pole pieces 4 and 6 so as to rest on a support surface in proximity to only one of these pole pieces 4, 6.

According to a particular feature of the invention, the pivoting guide means or the attraction means for first end 2 on the one hand, and the pivoting guide means or the attraction means for second end 3 on the other hand, can move along an axial direction D between stop members.

In the preferred embodiment of the invention, this anti-shock device 10 includes, on both sides of first end 2 and second end 3, on the one hand, means for attracting first end 2 to hold said first end 2 in abutment on a first pole piece 4, and on the other hand, in proximity to a second pole piece 6, means for attracting said second end 3 towards the second pole piece 6, and the means for attracting the first end 2, on the one hand, and the means for attracting said second end 3 on the other hand, can move along an axial direction D between stop members.

This axial direction D is illustrated in the Figures in the particular case in which it is linear. It may also be curvilinear. But the direction of mobility has to coincide with the flow direction of the magnetic or electrostatic field.

Advantageously, this anti-shock device 10 preferably includes means for damping the movement of at least one or of each of pole pieces 4, 6 and/or means for elastically returning at least one or each of pole pieces 4, 6. This damping means and/or this elastic return means are arranged to absorb the energy transmitted to pole pieces 4, 6 in the event of a shock, and after said shock, to make easier to return at least one or each of pole pieces 4, 6 to a position of stable equilibrium occupied thereby prior to said shock.

The good repositioning in the stable position is guaranteed by the magnetic or electrostatic forces.

In a particular embodiment, as seen in FIG. 1, anti-shock device 10 is arranged such that at least the first pole piece 4, or the second pole piece 6, includes guide means 14, 16, arranged to cooperate, via a strong acceleration imparted to component 1 in the event of a shock, by sliding along axial direction D, with complementary fixed guide means 15, 17 comprised in structure elements 12, 13 of device 10. Preferably, first pole piece 4 and second pole piece 6 respectively include these guide means 14, 16.

In a particular embodiment, anti-shock device 10 includes this damping means, which is of the viscous friction type.

In a particular embodiment, anti-shock device 10 includes this damping means, which includes a compressible fluid between the pole piece 4, 6 concerned and a stop member 42, 44, which limits the travel thereof to the opposite side to component 1.

Particularly, according to the invention, as seen in FIG. 1, the first pole piece 4 and the second pole piece 6 can each move in a chamber between two stop members, respectively 41 and 42, 43 and 44.

Preferably and advantageously, anti-shock device 10 includes means for damping the movement of each of pole pieces 4, 6 in their respective chamber.

In a particular embodiment, as seen in FIG. 1, anti-shock device 10 includes damping means including a deformable shape memory shock-absorber 23, 24, arranged to dissipate the kinetic energy of a shock and to slowly return to its initial shape after a shock.

Preferably, this deformable shape memory shock-absorber 23, 24 is made of neoprene.

In a particular embodiment, anti-shock device 10 may include both damping means and elastic return means, which are distinguished by their time constant, the return to a position of stable equilibrium being slower with the damping means than with the elastic return means.

In a particular embodiment, anti-shock device 10 may include one or more damping means made of a magnetic material with a form memory, in addition or in substitution to magnetic pole pieces; in this case only one component guarantees both the damping function and the generation of magnetic forces. In an other particular embodiment it may include compressible magnetic fluids or magnetic foams in addition or in substitution to magnetic pole pieces, to guarantee both the damping function and the generation of the canalization of the magnetic flow.

In a preferred embodiment and as seen in the Figures, the axial direction D is linear.

In a preferred embodiment, component 1 is made of material that is at least partially magnetically permeable, or at least partially magnetic at a first end 2 and at a second end 3.

According to the invention, anti-shock device 10 then includes, on both sides of first end 2 and second end 3, at an air-gap distance which is greater, by the value of a determined operational play J, than the distance of centers between first end 2 and second end 3, a first surface 5 of a first pole piece 4 and a second surface 7 of a second pole piece 6.

These pole pieces 4, 6 are arranged either each to be attracted by a magnetic field emitted by one of first end 2 or second end 3 of component 1, or each to generate a magnetic field attracting one of first end 2 and second end 3 of component 1. These magnetic fields have different intensity at first end 2 and second end 3, such that the magnetic attraction forces being exerted on component 1 at the two ends 2, 3 thereof are of different intensity, so as to attract component 1 via one of the two ends 2, 3 thereof, in direct or indirect contact onto a single one of surfaces 5, 7 of pole pieces 4, 6.

The fluid or foam may also be amagnetic. A deformable damper with form memory may also be amagnetic.

Preferably, first pole piece 4 and second pole piece 6 are each made of magnetic or magnetically permeable material and are magnetic if component 1 is not magnetic. First pole piece 4 and second pole piece 6 preferably together define an axial direction D, on which a longitudinal arbor of component 1 is aligned, joining the first end 2 and second end 3 thereof, when component 1 is inserted between first pole piece 4 and second pole piece 6.

The device is calculated such that the air-gap distance between first surface 5 and second surface 7 are dimensioned to ensure the determined operational play J over the entire range of temperatures of use of anti-shock device 10 and component 1.

FIG. 3 shows the principle of this magnetic anti-shock construction for component 1, which is illustrated, in a preferred but non-limiting application, in the form of a balance staff. The arbor of component 1 which is made of magnetically permeable material, typically soft ferromagnetic material, or of magnetic material, is placed between two pole pieces 4 and 6. This arbor may also consist of two half-arbors made of such material, each at an end 2, 3 of component 1. These pole pieces 4 and 6 are magnetized if component 1 is not, and they may be magnetically permeable or magnetized when component 1 is magnetized.

These pole pieces 4, 6 may, in particular, be formed of micro-magnets, whose polarities concord, and which define the pivoting of the arbor of component 1. This arbor is supported, either by two jewels inserted between the arbor and the pole pieces or magnets, or by a surface hardening treatment of the pole pieces or magnets.

According to the invention, the two pole pieces 4 and 6 can each move in a chamber limited by stop members, respectively 41, 42 on the one hand, and 43, 44 on the other hand. Their movement occurs according to an axial play, respectively $h_1$ and $h_2$.

The minimum distance between pole pieces 4 and 6 is set by the closest stop members 41 and 43 to the component, whereas the maximum distance is set by the stop members 42, 44 farthest from component 1, here formed by the bottom of the chambers.

The two pole pieces 4 and 6 and component 1 are arranged such that the magnetic forces and torques being exerted on the component are attraction forces, tending to attract component 1 towards contact surfaces 5 and 7 comprised either in pole pieces 4 and 6 or in struts 18, 19, which are inserted between these pole pieces and component 1.

The normal position of the pole pieces is that shown in FIGS. 1 and 3, in a position in which the magnetic fields are organised around component 1 with unbalance, such that the component only comes into contact with one of surfaces 5 or 7, namely surface 5 in the Figures, and remains at a distance J equal to the predetermined operational play of the other of said surfaces.

The mobility of pole pieces 4 and 6 is preferably impeded by damping means, or elastic return means. The preferred damping means may take various forms. FIG. 1 shows viscous friction means of pole pieces 4 and 6 in chambers in which the means can move, wherein the viscous friction can be completed by the presence of a compressible fluid between pole pieces 4, 6 and the stop members 42, 44 thereof farthest from component 1.

Or, as visible in FIG. 1, in a preferred embodiment, the damping means includes shock-absorbers 23, 24, arranged to absorb a shock by allowing axial mobility, along direction Z in FIG. 1, or the axial pivoting direction D in FIG. 3, of one or other of pole pieces 4 or 6 and to return said pole pieces slowly to the pre-shock position. Consequently, elastic return means, such as springs, may also be envisaged, however the stiffness thereof must be calculated so as to avoid too rapid a return, and a reverse shock effect on component 1, which is undesirable.

In a preferred embodiment for horology, particularly for damping a balance staff, as seen in FIG. 3, these shock-absorbers 23 and 24 are made of neoprene or silicon, or include at least one neoprene or silicon part, because of the slow shape return features of these shape memory materials.

These shock-absorbers, placed on the internal walls of guide chambers for pole pieces 4 and 6 and inside the stop members, are also used for dissipating the kinetic energy from the shock and preventing the pole pieces or magnets colliding with the walls or the rear stop members 42, 44 thereof on impact, or with the closest stop members 41, 43 to component 1 after the shock.

The shock-absorbers may also be designed to form the end stop members themselves, as in the case of FIG. 3 where they are fixed to the ends of complementary guide means 15 and 17, which are bores here, cooperating with guide means 14 and 16, in the form of cylindrical shoulders here, comprised in pole pieces 4 and 6.

The use of shock-absorbers is however unnecessary, if the axial play and energy of the magnets are sufficiently large, and if the magnets are subjected to viscous friction inside the chamber which ensures that the energy is dissipated.

Conventional radial anti-shock members 32 and 33, visible in FIG. 3, are advantageously arranged along the arbor, around shoulders 34, 35 of component 1, to prevent the arbor of component 1 leaving the area where the magnetic field is strongest, in the event of a shock. These radial anti-shock members 32 and 33 have no contact with component 1 when the latter is operating normally.

The size and energy of the magnets used, either in pole pieces 4 and 6 or in component 1, or in pole pieces 4 and 6 and in component 1, and the profile of the arbor of component 1 are optimised to produce a considerable force of magnetic attraction towards one of the two pole pieces.

The preferred case in which pole pieces 4 and 6 are magnetic is described more particularly here. They will also be called "magnets".

The value of the magnetic force is proportional to the magnetization $M_{axe}$ (r, z) and to the gradient of the magnetic field H produced by the two magnets:

$$\vec{F}_m = \mu_0 \int_{V_{axe}} d\vec{r}\vec{M}_{axe} \cdot \vec{\nabla} H$$

Integration occurs over the volume of the arbor $V_{axe}$. For all positions of the timepiece, hereinafter the "watch", the arbor thus abuts on the same magnet. The arbor is also subjected to the magnetic torque $C_m$:

$$\vec{C}_m = -\mu_0 \int d\vec{r}\vec{M}_{axe} \times \vec{H}$$

It is zero only if the arbor is oriented like the field lines, therefore in direction z. If the orientation of the arbor strays from direction z, the return torque $C_m$ reorients the arbor in the proper direction.

FIG. 1 thus illustrates an embodiment of a magnetic balance with axial symmetry: balance staff 1 made of soft magnetizable or magnetic material, is positioned between two permanent magnets 4 and 6, whose magnetic polarization is directed in the same direction, which is direction z in FIG. 3, here referenced axial direction D and corresponding to a pivot axis of component 1. The support of the balance staff can be ensured either by two jewels 18, 19, inserted between the magnets and the balance staff, or by a surface treatment of the magnets.

The magnetic interaction between the arbor and magnets results in a clear attraction towards magnet 4, greater than gravity.

The magnets have an axial play $h_1$ and $h_2$ respectively, determined by stop members 41, 42 and 43, 44. The axial play allows the energy from the shock to dissipate through the movement of the magnets. The function of radial shock-absorbers 32 and 33 is to prevent the arbor from leaving the area of magnetic influence, and they have no contact with component 1 when the latter is operating normally. This property is valid for all of the watch positions, and thus also for the vertical position.

Optimising the geometrical features of the parts has two results:

the clear attraction force between arbor 1 and magnet 4 is greater than the force of gravity and than the maximum force applied by the mechanical device with which the arbor is cooperating, on component 1 as seen in FIG. 3;

the magnetic attraction force between the two magnets 4 and 6 is sufficiently large always to bring the magnets into the minimum distance position after the shock, i.e. to bring the two magnets into contact with the stop members.

These two properties ensure that the configuration shown is stable equilibrium in the absence of any shocks and that this position of stable equilibrium is obtained again after a shock.

In the event of a radial shock, the arbor is held in the area of magnetic influence by anti-shock members 32 and 33: after the shock, recentering is ensured by magnetic interaction, which returns the arbor exactly to the center of the magnets by aligning said arbor perfectly in direction z.

Two situations are possible during an axial shock:

The system undergoes acceleration a=n g in direction z>0: in this case, magnet 4 and the arbor, which are subjected to the same acceleration, move jointly, maintaining contact due to magnetic attraction, whereas magnet 6 is blocked by stop member 43 thereof. The kinetic energy from the shock is dissipated by the friction of the magnet against the lateral walls of the chamber and/or the shock-absorber placed on stop member 44. After the, shock, magnetic attraction brings magnet 4 and arbor 1 into the position of equilibrium. The function of the friction and/or shock-absorber inside the stop member is to prevent an excessively energetic collision between magnet 4 and the stop member, which could involve the loss of contact between the arbor and magnet 4 and an energetic impact of the arbor against magnet 4. Once the magnets are in contact again against the stop members, the arbor is returned to its exact position of equilibrium by the magnetic force and torque.

Or the system undergoes acceleration a=n g in direction z<0: in this case, magnet 6 and arbor 1 are moved, whereas magnet 4 is locked by the stop member 41 thereof. Arbor 1 loses contact with pole piece 4, but it quickly enters into contact with pole piece 6. The impact between the arbor and magnet 4 has, however, very little energy even for a large acceleration such as a=3500 g, because the initial distance is very small, around 0.02 mm. By analogy with the preceding case, the energy from the impact is dissipated by the movement of magnet 6, owing to friction and/or shock-absorber 24 or in the mobility chamber of pole piece 6. After the shock, magnet 6, still in contact with the arbor, is moved back against the stop member. In this condition, the arbor is subjected to a clear attraction force towards magnet 4 and thus it is returned to contact therewith.

Since the dissipating members act on the movement of the magnets and not on the arbor, the dissipation due to balance pivot friction is almost zero in normal operation. The quality factor of the regulator is thus independent of the anti-shock function and may be much higher than for a conventional mechanical system.

In an alternative configuration, the arbor of the component may itself by a permanent magnet, thereby maximizing the magnetic forces and torques.

Substantial advantages result from the features of the invention:

exact radial re-centering of the arbor is always ensured after the shock;

the position of axial equilibrium and of ideal operation is always restored after the shock;

shock resistance is greater than that of conventional anti-shock devices;

friction and dissipation of energy are minimized;

the number of components is limited compared to other solutions;

the system can be integrated in other magnetic elements. The system therefore advantageously includes shielding means 20, seen in FIG. 1.

The determined operational play J is strictly positive. Preferably, the determined operational play J is greater than or equal to 0.020 mm.

The magnetic permeability of the material of component 1 is preferably selected and the magnetization (depending upon the particular case) of first pole piece 4 and second pole piece 6, on the one hand, and/or of component 1 on the other hand, is preferably achieved such that the magnetic fields attracting first end 2 and second end 3 each exert attraction forces on the component that are more than ten times greater than the gravitational force of attraction on component 1.

Preferably, the magnetic field density in proximity to the first surface 5 and second surface 7 is greater than or equal to 100000 A/m.

Anti-shock device 10 also advantageously includes shielding means 20, arranged to prevent the action of any magnetic field with a radial component relative to axial direction D, in proximity to first and second contact surfaces 5 and 7.

In the embodiment of FIG. 1, this shielding means 20 includes at least one tubular part 21, 22 centered on axial direction D and surrounding first pole piece 4 and second pole piece 6 and at least the second end 3 of component 1.

In a particular embodiment, at least first surface 5 includes a hard coating or is formed by a hard surface of a strut 18 inserted between first pole piece 4 and component 1. Likewise, a strut 19 may be inserted between second pole piece 6 and component 1.

In a particular variant, anti-shock device 10 includes magnetic field loop means between first pole piece 4 and second pole piece 6.

In another embodiment, the attraction between pole pieces 4, 6 and component 1 is electrostatic in nature. The notion of relative permittivity or dielectric constant is then substituted for the notion of magnetic permeability, and the notion of electrostatic field is substituted for that of magnetic field. The design of anti-shock device 10 is entirely similar and is sized according to the permanent electrostatic fields set up between component 1 and pole pieces 4 and 6.

In this version, anti-shock device 10 concerns the protection of a timepiece component 1 made of material that is at least partially conductive or at least partially electrized at a first end 2 and at a second end 3. According to the invention, this anti-shock device 10 includes, on both sides of said first and second ends 2 and 3, at a greater air-gap distance, by the value of a determined operational play J, than the distance of centers between first end 2 and second end 3, a first surface 5 of a first pole piece 4 and a second surface 7 of a second pole piece 6, wherein the magnetic poles pieces 4, 6 are arranged either each to be attracted by an electrostatic field transmitted by one of first end 2 or second end 3 of component 1, or each to generate an electrostatic field attracting one of first end 2 or second end 3 of component 1, and wherein said electrostatic fields have a different intensity at the first end 2 and second end 3, such that the electrostatic attraction forces being exerted on component 1 at the two ends 2, 3 thereof are of different intensity, so as to attract component 1 via one of the two ends thereof, in direct or indirect contact onto only one of surfaces 5, 7 of the pole pieces 4, 6. The first pole piece 4 and second pole piece 6 can each move in a chamber between two stop members 41, 42, or 43, 44 respectively.

In short, in this embodiment which relies on electrostatic forces and torques, it is possible to use a conductive material either for component 1, if pole pieces 4 and 6 are permanently electrized and charged with sufficient energy, or for pole pieces 4 and 6, if it is component 1 which is electrized and charged: this conductive material being polarized by induction in contact or from a distance owing to the parts which are permanently charged. A similar variant is obtained with the use of an insulating or semi-conductor dielectric instead of a conductor: polarization is then limited to the surface of the dielectric and the force and torque of attraction are less than those which develop when the material is conductive, but still permit use for a watch.

It is also possible, in another embodiment, to combine the action of electrostatic forces and torques and magnetic forces and torques.

Figure 5:
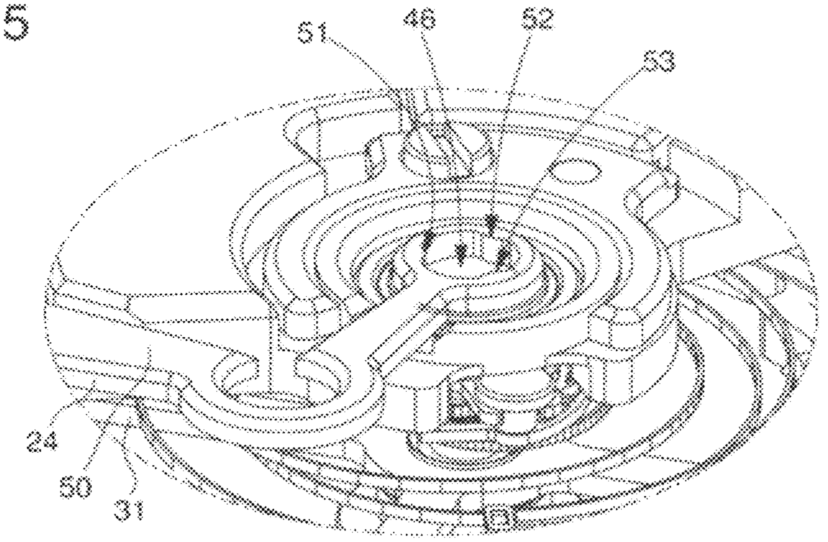
FIG. 5 shows a schematic, partial and perspective view of a damping element of FIG. 4.

FIGS. 4 and 5 illustrate an advantageous embodiment including a shock-absorber assembly, because of the high level of compactness and small total thickness thereof.

Support surface 18A is a polished, concave, spherical sector made in a jewel 18. The jewel is pressed onto a permanent magnet 4, which develops a residual magnetic field about 1 Tesla or higher than 1 Tesla on its surface. Opposite jewel 18, relative to magnet 4, there is arranged a support jewel 43 with a polished convex profile. Jewel 18, magnet 4 and support jewel 43 are inserted together in a setting 40, made for example of amagnetic material like brass oder titanium or made of beryllium copper. Preferably, jewel 19 and support jewel 46 are mounted in setting 40 by tightening or bonding, or by holding means ensuring a hold greater than 1N. This setting 40 slides freely in a block 41, which has an opening 34 for the passage of first end 2 of component 1, formed here by a sprung balance assembly. This block 41 includes, in proximity to opening 34, a radial anti-shock member or a radial shock-absorber 32, formed in particular by a shoulder that rotates around axis D.

The assembly is assembled such that the first end 2 of component 1 can move in abutment in the convex dome 18A and such that the convex sector of support jewel 43 is at the other end. This external block 41 acts as a stop member when component 1 is subject to shocks.

Preferably, the first end 2 of the component or balance 1 has a curvature, which is less than that of the concave calotte of jewel 18, so as to ensure contact on a single bridge. The concave curvature 18A of jewel 18 decreases the air-gap distance between pole piece 6 and first end 2 of component 1 and thus also forms an oil reservoir.

A similar assembly is placed at second end 3 of component 1. Support surface 19A is a polished, concave, spherical sector made in a jewel 19. The jewel is pressed onto a permanent magnet 6, which develops a residual magnetic field about 1 Tesla on its surface or higher than 1 Tesla. Opposite jewel 19, relative to magnet 4, there is arranged a support jewel 46 with a polished convex profile. Jewel 19, magnet 6 and support jewel 46 are inserted together in a setting 44, made for example of an amagnetic material like brass or titanium, or of beryllium copper. This setting 44 slides freely in a block 45, which has an opening 35 for the passage of second end 3 of component 1. Block 45 includes, in proximity to opening 35, a radial anti-shock member or radial shock-absorber 33, formed, in particular, by a shoulder that rotates around axis D. The assembly is assembled such that the second end 3 of component 1 can move in abutment in the convex dome 19A without contact during working in absence of shocks and such that the convex sector of support jewel 46 is at the other end. FIG. 4 illustrates this end assembly at second end 3 which is dampened by a shock-absorber formed by an elastic shock proof arm 50. This elastic arm 50, as seen in FIG. 5, is fixed to a plate 30 or a bridge 31. It has a free end, which abuts on the convex calotte of support jewel 46, via at least one contact surface and, in this preferred example, via three contact areas 51, 52, 53 arranged in a triangle. Thus the force is perfectly distributed and the axial holding of the carrier assembly for second pole piece 6 is ensured. This type of elastic safety arm is preferably mounted with pre-stress on the order of 0.5N. This pre-stress may be chosen egal to zero if it is required the anti-shock intervene irrespective of the shock's energy, without any activation threshold.

It is clear that the same assembly may be positioned, symmetrically, abutting on support jewel 43, in proximity to the first end 2 of component 1.

Magnets 4 and 6 are preferably permanent Nd—Fe—B magnets, for instance <<Vacodym®>> by <<Vacuumschmelze GmbH>>.

In an advantageous embodiment the magnetization or the electrostatic charge of each pole pieces is spatially variable and is dimensioned in order to optimize the norm and/or the direction of magnetic or electrostatic forces applied to component 1.

The invention also concerns a magnetic and/or electrostatic pivot 100 including a timepiece component 1, made of material that is at least partially magnetically permeable or at least partially magnetic at a first end 2 and a second end 3, or respectively at least partially conductive or at least partially electrized at a first end 2 and at a second end 3 and including an anti-shock device 10 of this type.

Preferably, this magnetic and/or electrostatic pivot 100 includes access means for inserting component 1 into the air-gap, or can be dismantled into several parts that include means for cooperating with each other and/or with a bridge 31 and/or a plate 30 to enable component 1 to be assembled in abutment via the first end 2 thereof on a first part, which includes first surface 5 and first pole piece 4, prior to the assembly of a second part, which includes second surface 7 and second pole piece 6.

Advantageously, a magnetic and/or electrostatic pivot 100 like that shown in FIG. 1 includes a component 1, which has a spindle-shaped part, rotating around axial direction D, which is linear, and whose section decreases from the center of gravity of component 1 towards second end 3, so as to improve the magnetic field gradient in proximity to second surface 7, and to facilitate the centering of second end 3 on axial direction D.

If component 1 is animated by a pivoting movement about axial direction D, magnetic and/or electrostatic pivot 100 advantageously includes a component 1 which is dynamically balanced, for the maximum pivoting velocity thereof, about a longitudinal arbor that joins first end 2 and second end 3.

Preferably, the first end 2 of component 1 is arranged with a surface having ponctual contact with first surface 5, the punctual contact surface being locally spherical or conical.

Advantageously, the first surface 5 includes a receiving surface arranged to cooperate with first end 2. The receiving surface is hollow and locally spherical or conical.

In a preferred application to an oscillator, component 1 is a balance whose pivot axis merges with axial direction D.

It is clear that this magnetic and/or electrostatic pivot 100 fitted with an anti-shock device 10 of this type may then adopt different configurations:

- It includes a component 1 including a substantially spindle-shaped part made of magnetically permeable or respectively conductive material, and the first pole piece 4 and second pole piece 6 are each made of magnetic material or respectively at least partially electrized material.
- It includes a component 1 including a substantially spindle-shaped part made of magnetic material, or respectively of at least partially electrized material, and the first pole piece 4 and second pole piece 6 are each made of magnetically permeable or respectively conductive material.
- It includes a component 1 including a substantially spindle-shaped part made of magnetic material, or respectively at least partially electrized material, and the first pole piece 4 and second pole piece 6 are each made of magnetically permeable, or respectively at least partially electrized material.

Naturally, it is possible to create a configuration with fields of a different nature at the two ends of component 1, magnetic at one end and electrostatic at the other.

The invention also concerns a timepiece movement 1000 including at least one anti-shock device 10 of this type, and/or at least one magnetic and/or electrostatic pivot 100 of this type.

The invention further concerns a timepiece including at least one timepiece movement 1000 of this type and/or at least one anti-shock device 10 of this type, and/or at least one magnetic and/or electrostatic pivot 100 of this type.

What is claimed is:

1. An anti-shock device for the protection of a timepiece component, made of material that is at least partially magnetically permeable, or respectively at least partially magnetic, and/or of material that is at least partially conductive, or respectively at least partially electrized, wherein said component is pivotally mounted in a chamber between a first end and a second end of said component, wherein said anti-shock device includes, on both sides of said first and second ends, on the one hand, means for attracting said first end to keep said first end abutting on a first pole piece, and on the other hand, in proximity to a second pole piece, means for attracting said second end towards said second pole piece, and wherein said means for attracting said first end, on the one hand and said means for attracting said second end, on the other hand, can move along an axial direction between stop members, and further wherein said first pole piece and said second pole piece are distinct from said component, and are each located on the periphery of or in proximity to said chamber, and are each made of material that is at least partially magnetic, or respectively at least partially magnetically permeable, and/or of material that is at least partially electrized or respectively at least partially conductive, and further wherein said component is freely mounted inside said chamber between said pole pieces, so as to rest on a support surface in proximity to only one of said pole pieces.

2. The anti-shock device according to claim 1, wherein it includes means for dampening the movement of at least one or of each of said pole pieces, and/or means for elastically returning at least one or each of said pole pieces, wherein said damping means and/or said elastic return means are arranged to absorb the energy transmitted to said pole pieces in the event of a shock, and, after said shock, to return at least one or each of said pole pieces to the position of stable equilibrium occupied thereby prior to said shock.

3. The anti-shock device according to claim 1, wherein at least said first pole piece or said second pole piece includes guide means arranged to cooperate, under a strong acceleration imparted to said component in the event of a shock, by sliding along an axial direction, with complementary fixed guide means comprised in said device.

4. The anti-shock device according to claim 1, wherein it includes means for damping the movement of at least one or each of said pole pieces, arranged to absorb the energy transmitted to said pole pieces in the event of a shock, and after said shock, to return at least one or each of said pole pieces to the position of stable equilibrium occupied thereby prior to said shock, and in that said damping means is of the viscous friction type.

5. The anti-shock device according to claim 1, wherein it includes means for damping the movement of at least one or each of said pole pieces, arranged to absorb the energy transmitted to said pole pieces in the event of a shock, and after said shock, to return at least one or each of said pole pieces to the position of stable equilibrium occupied thereby prior to said shock, and wherein said damping means includes a compressible fluid between said pole piece concerned and a stop member which limits the travel thereof to the opposite side to said component.

6. The anti-shock device according to claim 1, wherein it includes means for damping the movement of at least one or each of said pole pieces, arranged to absorb the energy transmitted to said pole pieces in the event of a shock, and after said shock, to return at least one or each of said pole pieces to the position of stable equilibrium occupied thereby prior to said shock, and wherein said damping means includes a deformable shape memory shock-absorber, arranged to dissipate the kinetic energy from a shock and to return to the initial shape thereof after a shock.

7. The anti-shock device according to claim 6, wherein said deformable shape memory shock-absorber is formed by an elastic arm fixed to a plate or a bridge and which includes a free end, which abuts on a convex calotte of a support jewel on at least one contact surface.

8. The anti-shock device according to claim 6, wherein said movement damping means includes a block in which a setting slides freely, which together hold a jewel including a concave support surface of said first or second end of said component, said jewel resting on one said pole piece, which in turn abuts on a support jewel capable of cooperating with one said deformable shape memory shock-absorber.

9. The anti-shock device according to claim 1 for the protection of a timepiece component, made of material that is at least partially magnetically permeable or at least partially magnetic at said first end and at said second end, wherein it includes, on both sides of said first and second ends, at a greater air-gap distance, by the value of a determined operational play, than the distance of centers between said first end and said second end, a first surface of said first pole piece and a second surface of said second pole piece, wherein said magnetic poles pieces are arranged either each to be attracted by a magnetic field transmitted by one of said first end or second end of said component, or each to generate a magnetic field attracting one of said first end or second end of said component, and wherein said magnetic fields have a different intensity at said first end and said second end, such that the magnetic attraction forces being exerted on said component at the two ends thereof are of different intensity, so as to attract said component via one of the said two ends thereof, in direct or indirect contact onto only one of said surfaces of said pole pieces, and wherein said first pole piece and said second pole piece can each move inside said chamber between two stop members.

10. The anti-shock device according to claim 9, wherein it includes shielding means, arranged to prevent the action of any magnetic field with a radial component relative to said axial direction, in proximity to said first and second contact surfaces.

11. The anti-shock device according to claim 10, wherein said shielding means includes at least one tubular part, centered on said axial direction and surrounding said first pole piece and said second pole piece and at least said second end of said component.

12. The anti-shock device according to claim 1 for the protection of a timepiece component, made of material that is at least partially conductive or at least partially electrized at said first end and at said second end, wherein it includes, on both sides of said first and second ends, at a greater air-gap distance, by the value of a determined operational play, than the distance of centers between said first end and said second end, a first surface of said first pole piece and a second surface of said second pole piece, wherein said magnetic poles pieces are arranged either each to be attracted by an electrostatic field transmitted by one of said first end or second end of said component, or each to generate an electrostatic field attracting one of said first end or second end of said component, and wherein said electrostatic fields have a different intensity at said first end and said second end, such that the electrostatic attraction forces being exerted on said component at the two ends thereof are of different intensity, so as to attract said component via one of the said two ends thereof, in direct or indirect contact onto only one of said surfaces of said pole pieces, and wherein said first pole piece and said second pole piece can each move inside said chamber between two stop members.

13. The anti-shock device according to claim 1 where the magnetization or the electrostatic charge of each said pole pieces is spatially variable and is dimensioned in order to optimize the norm and/or the direction of magnetic or electrostatic forces applied to said component.

14. A magnetic and/or electrostatic pivot including a timepiece component, made of a material that is at least partially magnetically permeable or at least partially magnetic at said first end and at said second end, or respectively at least partially conductive or at least partially electrized at said first end and at said second end, wherein it includes an anti-shock device according to claim 1.

15. The magnetic and/or electrostatic pivot according to claim 14, wherein it includes one said component including a substantially spindle-shaped part made of magnetically permeable or respectively conductive material, and wherein said first pole piece and said second pole piece are each made of magnetic material, or respectively at least partially electrized material.

16. The magnetic and/or electrostatic pivot according to claim 14, wherein it includes one said component including a substantially spindle-shaped part made of magnetic material, or respectively of at least partially electrized material, and wherein said first pole piece and said second pole piece are each made of magnetically permeable, or respectively conductive material.

17. The magnetic and/or electrostatic pivot according to claim 14, wherein it includes one said component including a substantially spindle-shaped part made of magnetic material or respectively at least partially electrized material, and wherein said first pole piece and said second pole piece are each made of magnetically permeable, or respectively at least partially electrized material.

18. The timepiece movement including at least one anti-shock device according to claim 1.

19. The timepiece including at least one anti-shock device according to claim 1.

20. The timepiece movement including at least one magnetic and/or electrostatic pivot according to claim 14.

21. The timepiece including at least one magnetic and/or electrostatic pivot according to claim 14.

* * * * *